United States Patent
Pongracz et al.

(10) Patent No.: US 9,688,284 B2
(45) Date of Patent: Jun. 27, 2017

(54) METHOD AND DEVICE FOR MONITORING A DRIVE OF A MOTOR VEHICLE

(71) Applicant: Robert Bosch GmbH, Stuttgart (DE)

(72) Inventors: Gabor Pongracz, Vienna (AT); Dalibor Kovac, Vienna (AT); Matthias Schueler, Steinheim (DE)

(73) Assignee: Robert Bosch GmbH, Stuttgart (DE)

( * ) Notice: Subject to any disclaimer, the term of this patent is extended or adjusted under 35 U.S.C. 154(b) by 51 days.

(21) Appl. No.: 14/488,843

(22) Filed: Sep. 17, 2014

(65) Prior Publication Data

US 2015/0081192 A1 Mar. 19, 2015

(30) Foreign Application Priority Data

Sep. 17, 2013 (DE) ........................ 10 2013 218 554

(51) Int. Cl.
*B60W 50/02* (2012.01)

(52) U.S. Cl.
CPC ... *B60W 50/0205* (2013.01); *B60W 2520/105* (2013.01); *B60W 2540/10* (2013.01)

(58) Field of Classification Search
CPC ....... B60W 2520/105; B60W 2540/10; B60W 50/0205; G06F 17/00; G06F 11/00; G06K 9/00; G06K 9/6272; G06K 9/6223; F02D 41/22; B60R 16/0315
USPC ............................. 701/29.1, 99, 29.7, 29.8
See application file for complete search history.

(56) References Cited

U.S. PATENT DOCUMENTS

| | | | | |
|---|---|---|---|---|
| 5,058,893 A | * | 10/1991 | Dickinson | G07C 3/00 273/143 R |
| 5,088,043 A | * | 2/1992 | Akishino | B60K 31/00 180/179 |
| 5,126,942 A | * | 6/1992 | Matsuda | B60K 23/0808 180/197 |
| 5,212,640 A | * | 5/1993 | Matsuda | B60G 17/0185 180/197 |
| 5,476,425 A | * | 12/1995 | Shiraishi | B60W 10/06 477/109 |
| 5,880,568 A | * | 3/1999 | Bederna | B60T 8/175 318/139 |
| 6,021,370 A | * | 2/2000 | Bellinger | B60K 31/047 701/110 |

(Continued)

FOREIGN PATENT DOCUMENTS

DE 44 38 714 5/1996
DE 10 2011 075609 11/2012

Primary Examiner — Fadey Jabr
Assistant Examiner — Angelina Shudy
(74) Attorney, Agent, or Firm — Gerard Messina (57) ABSTRACT

A method for monitoring a drive of a motor vehicle, including acceleration monitoring, including: ascertaining an actual acceleration of the motor vehicle with the aid of a signal of a kinematics sensor, in particular of an acceleration sensor or of a wheel speed sensor, ascertaining a permissible acceleration of the motor vehicle as a function of a position of a gas pedal, and ascertaining the permissibility of an operating state of the drive as a function of the ascertained actual acceleration and the ascertained permissible acceleration, the permissibility of the operating state of the drive being monitored with the aid of alternative monitoring instead of acceleration monitoring when the operating state of the drive meets at least one predetermined condition.

14 Claims, 4 Drawing Sheets

(56) References Cited

U.S. PATENT DOCUMENTS

| | | | | |
|---|---|---|---|---|
| 6,516,255 B2* | 2/2003 | Jager | B60W 30/1884 | 701/29.2 |
| 6,637,530 B1* | 10/2003 | Endo | B60K 6/365 | 180/65.25 |
| 8,311,700 B2* | 11/2012 | Murakami | B60W 30/188 | 123/350 |
| 8,467,929 B2* | 6/2013 | Bechtler | B60T 8/885 | 701/29.1 |
| 9,272,696 B2* | 3/2016 | Kim | B60T 17/22 | |
| 9,533,573 B2* | 1/2017 | Chae | B60K 31/00 | |
| 2001/0027362 A1* | 10/2001 | Nishida | G05B 9/02 | 701/29.7 |
| 2003/0143957 A1* | 7/2003 | Lyon | B60W 10/06 | 701/1 |
| 2005/0034540 A1* | 2/2005 | Juranitch | G01M 13/02 | 73/862.322 |
| 2009/0017983 A1* | 1/2009 | Iwase | B60K 6/445 | 477/3 |
| 2010/0036558 A1* | 2/2010 | Murakami | B60W 30/188 | 701/31.4 |
| 2011/0301834 A1* | 12/2011 | Tao | G01C 21/26 | 701/435 |
| 2012/0290187 A1* | 11/2012 | Oesterreicher | B60W 50/0205 | 701/99 |
| 2013/0138318 A1* | 5/2013 | Choby | B60T 8/172 | 701/84 |
| 2013/0311034 A1* | 11/2013 | Falkenstein | B60K 6/48 | 701/33.7 |
| 2014/0025252 A1* | 1/2014 | Lai | G08G 1/205 | 701/32.4 |
| 2014/0324283 A1* | 10/2014 | Kim | B60T 17/22 | 701/33.9 |
| 2014/0343817 A1* | 11/2014 | Moellmann | B60W 50/0205 | 701/70 |
| 2015/0081183 A1* | 3/2015 | Schueler | B60W 10/04 | 701/53 |
| 2015/0105997 A1* | 4/2015 | Wagner | B60W 10/06 | 701/103 |
| 2016/0010579 A1* | 1/2016 | Takahashi | F02D 41/22 | 701/104 |
| 2016/0133064 A1* | 5/2016 | Patino | B60W 50/04 | 701/29.1 |
| 2017/0008526 A1* | 1/2017 | Ko | B60W 30/18009 | |

* cited by examiner

METHOD AND DEVICE FOR MONITORING A DRIVE OF A MOTOR VEHICLE

RELATED APPLICATION INFORMATION

The present application claims priority to and the benefit of German patent application no. 10 2013 218 554.5, which was filed in Germany on Sep. 17, 2013, the disclosure of which is incorporated herein by reference.

FIELD OF THE INVENTION

The present invention relates to a method for monitoring a drive of a motor vehicle. In further aspects, the present invention relates to a computer program for carrying out this method, to an electric memory medium, and to a control unit.

BACKGROUND INFORMATION

An acceleration-based method for monitoring the safety of a drive is discussed in DE 10 2011 075 609 A1. Here, a setpoint torque is calculated in a safety function as a function of a gas pedal signal characteristic of the position of the gas pedal. An expected vehicle acceleration is determined in the safety function as a function of the setpoint torque. Moreover, an actual vehicle acceleration is determined, for example, with the aid of an acceleration sensor. An error situation is detectable by comparing the actual vehicle acceleration and the expected vehicle acceleration.

A method for controlling the drive power of a vehicle is discussed in DE 44 38 714 A1, only a microcomputer being provided for carrying out control functions and monitoring functions. At least two levels which are independent of each other are established in the microcomputer, a first level carrying out the control functions and a second level carrying out the monitoring functions.

SUMMARY OF THE INVENTION

If, in contrast, a drive of a motor vehicle is monitored in such a way that the monitoring includes acceleration monitoring including the following steps:
  ascertaining an actual acceleration of the motor vehicle with the aid of a signal of a kinematics sensor, in particular of an acceleration sensor or of one or multiple wheel speed sensors,
  ascertaining a permissible acceleration of the motor vehicle, in particular as a function of a position of a gas pedal, and
  ascertaining the permissibility of an operating state of the drive as a function of the ascertained actual acceleration and the ascertained setpoint acceleration,
  the permissibility of the operating state of the drive being monitored with the aid of alternative monitoring instead of acceleration monitoring when the operating state of the drive meets at least one predetermined condition, then this has the advantage that the method for monitoring is more robust and safer than sole acceleration monitoring.

It has been found that the robustness of monitoring which is carried out solely as acceleration monitoring may thus be considerably increased in certain operating states of the drive. It is complex to devise sole acceleration monitoring in such a way that in particular inadvertent accelerations may be reliably and quickly detected in all operating states, without resulting in undesired operating constraints. Such operating constraints may be, e.g., the deactivation of the drive train when it is not possible to safely preclude that an inadvertent acceleration takes place.

The term drive here shall be understood within the sense of the entire drive train. The drive may thus include all components which influence the propulsion of the motor vehicle, in particular an engine, which may be configured as an internal combustion engine or as an electric motor, if necessary clutches and a transmission, and a braking system. It is also conceivable that the drive includes multiple engines, for example, an internal combustion engine and multiple electric motors.

The kinematics sensor here is such a sensor which measures a physical variable characterizing the longitudinal acceleration of the motor vehicle. This may be an acceleration sensor, for example. However, the kinematics sensor may also ascertain a rotational speed of a wheel of the motor vehicle, from which a signal characterizing the acceleration of the motor vehicle is obtainable with the aid of differentiation.

It is particularly advantageous if the alternative monitoring is rotational speed monitoring. This rotational speed monitoring advantageously includes the following steps:
  ascertaining an actual rotational speed of an engine of the motor vehicle,
  ascertaining a permissible engine speed, and
  preventing injections of an internal combustion engine when the actual rotational speed is greater than the permissible engine speed.
  Optionally, an operation of the electric machine is limited to generator mode, or a neutral torque is required, when the drive includes at least one motor-drivable electric machine and a rotational speed of the electric machine exceeds a rotational speed corresponding to the permissible engine speed (it being possible that the corresponding rotational speed is adapted by a gear ratio to the coupling between the electric machine and the internal combustion engine).

Using such rotational speed monitoring as alternative monitoring to acceleration monitoring has the advantage that it is considerably easier to implement than, e.g., torque monitoring, and that it is reliable in the operating states in which it takes the most complexity, or is possible only with difficulty, to ensure the reliability and robustness of sole acceleration monitoring.

Compared to sole rotational speed monitoring, the described method in contrast has the advantage that the drivability is improved. Moreover, the described method does not require constant involvement of the driver for error detection, and also does not result in any emission-relevant constraints, since, e.g., injections for heating the catalytic converter may also be possible above the permissible engine speed.

It is particularly advantageous to make the permissible engine speed dependent on the position of the gas pedal. The effects of the rotational speed limitation are thus more comfortable for the driver.

One further possible embodiment of the alternative monitoring may provide for devising the same as torque monitoring, where a setpoint torque of the engine is compared to an actual torque of the engine which is derived from actuating variables of the engine, and a decision on whether the operating state of the drive is permissible is made as a function of the result of this comparison.

As was already mentioned, at least one predetermined condition should be selected in such a way that an operating state meets this condition when it would be complex, or possibly only with difficulty, to ensure the reliability and robustness of sole acceleration monitoring.

As described, sensor signals are considered in the acceleration monitoring. It is possible in certain operating states that these sensor signals are not reliably transmittable, for example because parts of a communication system in the motor vehicle are not operational. For example, it is the responsibility of this communication system, e.g., a CAN bus, to ensure signals are transmitted from the sensor to a control unit on which the monitoring method runs. If this transmission is not ensured, it is advantageous if an alternative monitoring method runs in place of the acceleration monitoring. According to one further aspect of the present invention, it is thus provided that a predetermined condition is selected in such a way that the operating state meets this condition when a reliable transmission of sensor signals considered in the acceleration monitoring from the assigned sensor to an electronic arithmetic unit, on which the acceleration monitoring runs, is not possible. Instead of sensor signals whose transmission is not reliably possible, a corresponding procedure may also be used for signals which are ascertained by a (further) control unit.

For example, such operating states exist in operating modes which those skilled in the art refer to as "pre-drive mode" or as "post-drive mode." The pre-drive mode here refers to the powering up of the electronics in the motor vehicle after terminal 15 was closed, i.e., after the driver signaled with the ignition key, for example, that he wants to start the motor vehicle. In this pre-drive mode, the bus communication in the motor vehicle is limited. This applies similarly to the post-drive mode, which is also known as control unit caster. In this post-drive mode, for example, diagnostic functions are still carried out after the motor vehicle has been shut down. The bus communication in the motor vehicle is also limited here. It is thus particularly advantageous to provide that the predetermined condition is met when the operating state is a pre-drive mode or a post-drive mode.

Further operating states in which a signal evaluation is not reliably possible exist, e.g., when a rotational speed signal of one or multiple wheel speed sensors fails, which may cause the acceleration monitoring not to function reliably. Advantageously, the predetermined condition is thus selected in such a way that it is met when one or multiple wheel speed sensors fail(s) or the signals transmitted by them are invalid. For example, the transmitted signals may be invalid in the case of multiple wheel speed sensors when at least 2 wheel speed sensors fail. The term sensor failure here shall be understood to have such a broad meaning that it also includes situations in which the sensor functions, while a downstream evaluation unit (for example, a control unit) does not function properly.

Similarly, depending on the configuration of the acceleration monitoring, a sensor signal which characterizes a kinematic variable of the motor vehicle may be considered in the acceleration monitoring. The term "kinematic variable" here means a physical variable which characterizes the movement of the motor vehicle, such as its speed, acceleration and the like. It is thus advantageous if the predetermined condition is selected in such a way that it is met when such a signal of a sensor characterizing a kinematic variable of the motor vehicle, in particular a speed or an acceleration, fails. However, it is also possible to select the predetermined condition in such a way that it is met when the signal becomes invalid, or its accuracy or signal quality worsens. Worsening of the signal quality may exist, e.g., when an input signal for calculating the vehicle speed on another control unit is missing and a switch to a model-based calculation is made.

If the motor vehicle is decelerated with the aid of the braking system, deviations from the actual acceleration may occur within the scope of the acceleration monitoring, in particular during the ascertainment of the permissible acceleration, for example, when an operating constraint exists in the braking system. For example, brake disks may be icy, which results in a reduction of the braking power. Or the brake disks may be overheated, which also results in a reduction of the braking power (this phenomenon is also known to those skilled in the art as glazing of the brake disks or as "fading"). It is also possible that the braking power does not correspond to the expected braking power when the motor vehicle is overloaded, or when a trailer of the motor vehicle is overloaded, or when the trailer does not supply the expected braking power.

Within the scope of the acceleration monitoring, it is not readily possible to distinguish such a reduced braking power from a case in which the engine of the motor vehicle erroneously accelerates. To preclude misguided interventions of the acceleration monitoring, however, it is necessary to distinguish these cases.

In one further aspect of the present invention, it is thus provided to devise the predetermined condition in such a way that it is met when the motor vehicle is decelerated, and a difference between the actual acceleration and the permissible acceleration exceeds a predefinable threshold value. The word "decelerated" here shall be understood to mean that the braking system carries out a brake intervention, but not within the sense that the speed of the motor vehicle necessarily decreases. In particular, it is also possible that the speed of the motor vehicle also increases during a brake intervention.

Within the scope of an electronic engine control unit, whose function is monitored by the monitoring function, as is known from DE 44 38 714 A1, for example, an acceleration control unit may be provided at the functional level (level 1), for example, which specifies a setpoint torque for the engine and reduces this setpoint torque when the actual acceleration is greater than the permissible acceleration. This means that in such an embodiment the acceleration monitoring unit supplies a signal that the actual acceleration is too high, and the acceleration control unit responds accordingly by reducing the setpoint torque, without the driver input value being changed.

However, situations are possible in which it is detected that the actual acceleration is too high, although the setpoint torque is very low. For example, this may be due to strong tailwind or changed friction values of the motor vehicle, so that the ascertainment of the permissible acceleration within the scope of the acceleration monitoring supplies a faulty value, in particular one which is too low. In particular, situations are conceivable in which the actual acceleration exceeds the permissible acceleration, even if the acceleration control unit reduces the setpoint torque to zero or reduces the engine drag torque. This means that it is possible that the acceleration monitoring does not result in an adequate reaction of the engine control unit.

To prevent this, it is provided in one further aspect that the predetermined condition is devised in such a way that it is met when the actual acceleration is greater by at most a second predefinable threshold value than the permissible acceleration, and a setpoint torque or driver input torque is so low that the actual acceleration would still be greater than the permissible acceleration even if it were further reduced to the drag torque. Such a setpoint torque which is too low may be determined, for example, in that the setpoint torque is to be smaller than a maximum torque, the maximum torque being stored as a characteristic curve as a function of the actual acceleration, for example. By limiting the difference between the actual acceleration and the permissible acceleration to a threshold value, it is ensured that an error response is also immediately triggered at clear, strong inadvertent accelerations.

For calculating the acceleration equation, it is important to know the driving direction to correctly include rolling friction, air drag and brake forces in the calculation. However, situations in which the driving direction information is not available are also possible, e.g., with wheel speed sensors having no directional measurement or when sliding on slippery roads. By assuming an incorrect driving direction, acceleration monitoring may become unrobust or unsafe.

According to one further aspect of the present invention, it may thus be provided to provide a driving direction detection device and to receive a driving direction signal from it to carry out the acceleration monitoring as a function of this driving direction signal. For example, driving direction detection devices (e.g., an ESP system) may transmit a driving direction signal in such a way that it provides the values "forward" when a forward movement of the motor vehicle is detected, "reverse" when a reverse movement of the motor vehicle is detected, "stoppage" when a stoppage of the motor vehicle is detected, and "unknown," if a reliable distinction between at least two of the three aforementioned driving direction states is not possible.

According to one further aspect of the present invention, it is thus provided to devise the predetermined condition in such a way that it is met when the signal is received from the driving direction detection device that a driving direction of the motor vehicle is unknown, i.e., when the driving direction detection device reports the signal "unknown."

Moreover, it is possible that the motor vehicle is operated on a test bench, for example in a repair shop. On such a test bench, it is possible for the motor vehicle to be supported on rollers, so that the wheels of the motor vehicle rotate, although the motor vehicle is not in motion. Depending on the configuration of the acceleration monitoring, for example, this may result in an actual deceleration of the motor vehicle which is too low (=negative actual acceleration) being erroneously decided on, e.g., during braking, since, e.g., an acceleration sensor does not measure any deceleration. To prevent an undesired error response, it may be provided in one further aspect of the present invention to devise the predetermined condition in such a way that it is met when it is detected that the motor vehicle is operated in a test bench operation, for example, with the aid of a signal at a diagnostic interface of the motor vehicle.

The end of the test bench operation is then ascertainable, for example, in that the acceleration sensor signals an actual acceleration.

If no safety risk exists, e.g., when the motor vehicle is in the test bench operation, it is also possible that the acceleration monitoring is not replaced with the alternative monitoring (in particular the rotational speed monitoring), but to (temporarily) deactivate the acceleration monitoring unit. As soon as a safety risk may exist again from the deactivated acceleration monitoring unit, e.g., when the test bench operation is ended, the acceleration monitoring unit may be re-activated.

It may be provided in one further aspect that the predetermined condition is devised in such a way that it is met when a signal is received from a collision detection device that external action on the motor vehicle is present. Such a collision detection device may be an airbag system, for example. The external action may be an accident, for example. In such a situation, it is possible that the acceleration monitoring unit detects a faulty acceleration and initiates a corresponding error entry, which makes it difficult to clarify the question who is at fault in the case of multiple rear-end collisions, for example. If a switch is made in such a case to alternative monitoring, in particular to rotational speed monitoring, incorrect error entries in the diagnostic system are preventable.

Of course, the configuration of the monitoring function is not limited to checking only a single condition. Rather, the aforementioned conditions may be combined in any arbitrary combination. This means that it is possible in one embodiment of the present invention that a list of conditions is checked, and when the operating state of the drive meets at least one of these conditions, a switch is made to alternative monitoring in place of acceleration monitoring.

In one further aspect, the present invention relates to a computer program which is configured to carry out all steps of one of the described methods.

In one further aspect, the present invention relates to an electronic memory medium on which this computer program is stored.

In one further aspect, the present invention relates to a control unit which includes such an electronic memory medium.

The figures show particularly advantageous specific embodiments of the present invention.

DETAILED DESCRIPTION

Figure 1:
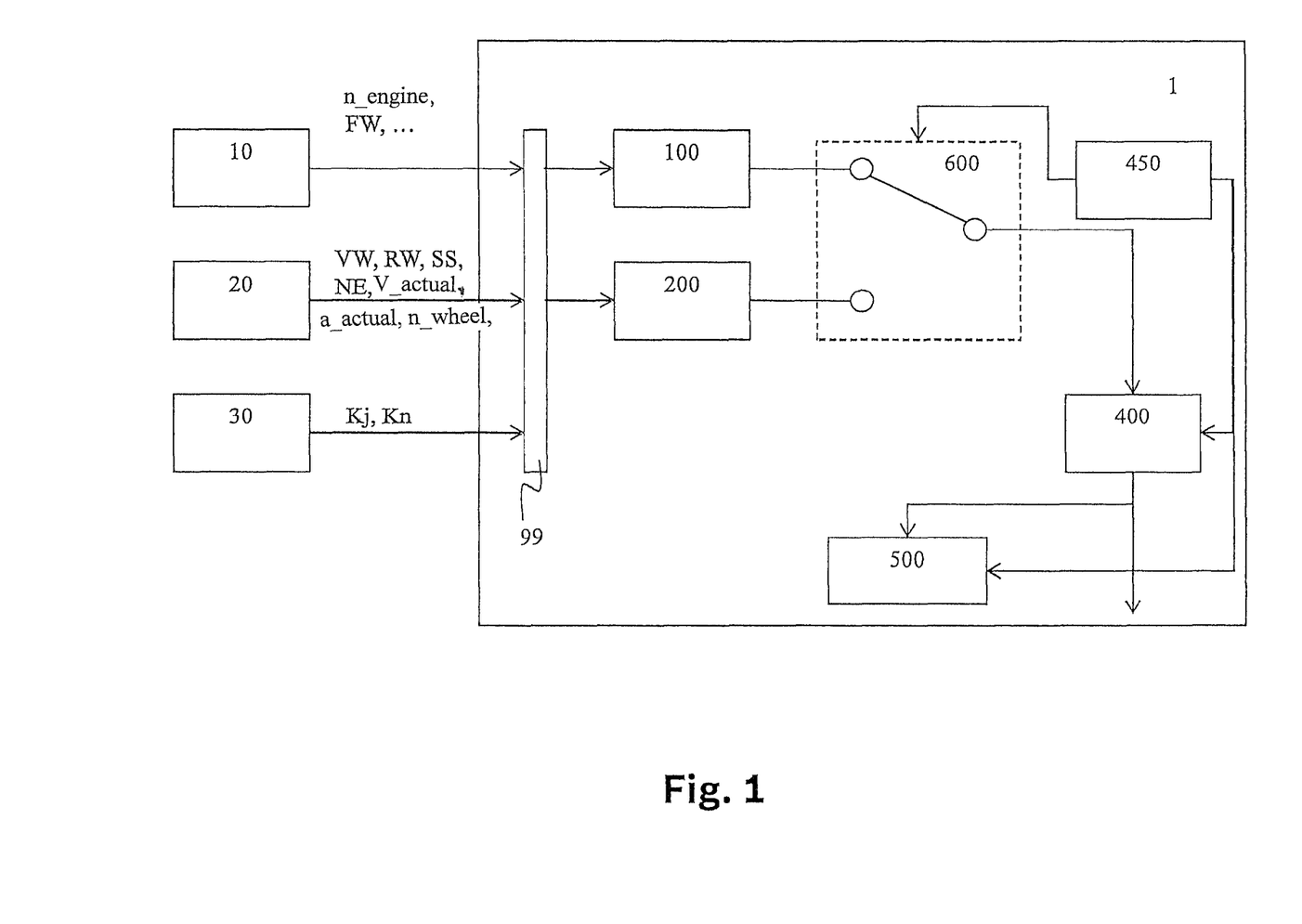
FIG. 1 schematically shows the configuration of the monitoring method of the drive train.

FIG. 1 schematically shows the configuration of a device which is able to carry out the monitoring method. FIG. 1 shows a control unit 1, e.g., an engine control unit, which controls an engine of the motor vehicle. Control unit 1 receives data from external devices via an interface 99. For example, sensors installed in a drive train 10 transmit rotational speed n_engine of a crankshaft of the engine (instead of rotational speed n of the crankshaft, it is also possible to use another rotational speed characterizing the actual rotational speed of the engine, e.g., a rotational speed of a camshaft) and/or rotational speed n_wheel of one wheel or multiple wheels of the motor vehicle and/or an actual velocity v_actual of the motor vehicle and/or actual acceleration a_actual of the motor vehicle and/or driver input FW ascertained from an actuating degree of the gas pedal, which is usually normalized to values between 0 (gas pedal not actuated) and 1 (gas pedal fully actuated).

Instead of a detection with the aid of sensors, however, it is also possible to indirectly ascertain several or all of these variables, for example also by ascertaining them within control unit 1.

In this exemplary embodiment, an ESP control unit 20 acts as the driving direction detection device and transmits a signal about the driving direction of the motor vehicle to interface 99, this signal potentially including a state VW, which means that it was detected that the motor vehicle is moving in the forward direction, the signal further potentially including a state RW, which means that it was detected that the motor vehicle is moving in the reverse direction, the signal further potentially including a state SS, which means that it was detected that the motor vehicle is stopped, and the signal potentially including a state NE, which means that it was not possible to reliably detect whether the vehicle is moving forward, or whether it is moving backward, or whether it is stopped.

For example, it is also possible that signals are not transmitted directly by sensors, but by ESP control unit 20. For example, it is possible that ESP control unit 20 provides wheel speed n_wheel and/or actual velocity v_actual and/or actual acceleration a_actual.

An airbag control unit 30 transmits a signal having two potential states to interface 99, namely a state Kn, which indicates that no collision of the motor vehicle was detected, and one further state Kj, which indicates that a collision of the motor vehicle was detected.

Moreover, an acceleration monitoring unit 100 and an alternative monitoring unit—here in the form of a rotational speed monitoring unit 200—are implemented in control unit 1. Acceleration monitoring unit 100 and rotational speed monitoring unit 200 receive some or all of the variables received by interface 99 as input variables from interface 99. At their outputs, acceleration monitoring unit 100 and rotational speed monitoring unit 200 have a signal which indicates whether the particular monitoring method found an error in the drive train of the motor vehicle. These output signals are transmitted to an evaluation block 400, in the exemplary embodiment shown here a switch block 600 being provided, which receives the output signals of acceleration monitoring unit 100 and of rotational speed monitoring unit 200 and which, depending on the position of a switch, either transmits the output signal of acceleration monitoring unit 100 or the output signal of rotational speed monitoring unit 200 to evaluation block 400.

In evaluation block 400, the output signals transmitted to it are analyzed, and an evaluation signal is supplied to a measures block 500, which initiates counter measures as a function of the evaluation signal.

Based on the instantaneous operating state of the drive of the motor vehicle, a switching control block 450 decides on whether the output signal of acceleration monitoring unit 100 or the output signal of rotational speed monitoring unit 200 is transmitted to evaluation block 400 and activates switching block 600 accordingly. Switching control block 450 optionally transmits a signal providing information about this activation of switching block 600 to evaluation block 400 and to measures block 500.

Figure 2:
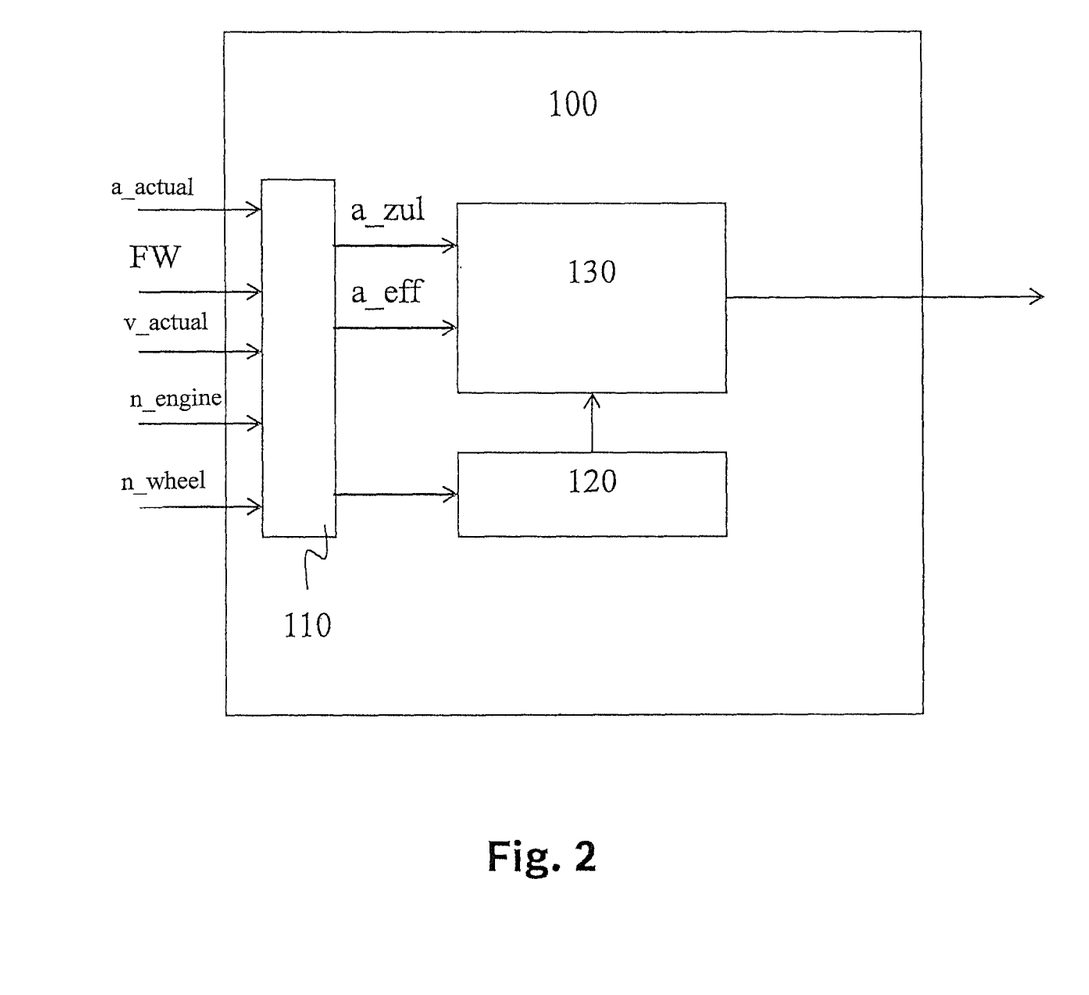
FIG. 2 schematically shows the configuration of the acceleration monitoring.

FIG. 2 shows one specific embodiment of acceleration monitoring unit 100. An interface 110 receives a signal about actual acceleration a_actual of the motor vehicle, the signal about driver input FW, and optionally a signal about an actual velocity v_actual of the motor vehicle, and optionally signal n_engine about the rotational speed of the crankshaft of the motor vehicle, and optionally signal n_wheel about the wheel rotational speed of the motor vehicle.

Permissible acceleration a_zul is ascertained as a function of driver input FW and is transmitted to a control block 130. As a function of actual acceleration a_actual, an effective actual acceleration a_eff is ascertained, which may be selected to be identical to actual acceleration a_actual, for example, but which may also be corrected by the inertia of the rotating masses of the drive train (engine, crankshaft, wheels, . . . ), for example according to the formula $$a\_eff = a\_\text{actual} + C1 * dn\_\text{engine}/dt + C2 * dn\_\text{wheel}/dt,$$

C1 corresponding to a moment of inertia of the masses rotating at rotational speed n_engine of the crankshaft, and C2 corresponding to a moment of inertia of the masses rotating at wheel speed n_wheel.

As is known from DE 10 2011 075 609 A1, acceleration monitoring unit 100 may further include a block 120 which ascertains, for example, whether a tow start process of the motor vehicle is present, or whether a traction interruption is present, and the result of this analysis is transmitted to control block 130.

The control block checks whether effective acceleration value a_eff is greater than permissible acceleration value a_zul. If this is the case, a decision is then made that an impermissible acceleration or insufficient deceleration is present in the drive train, and this result is output. If a_eff is lower than a_zul, a decision is then made that no error is present in the drive train, and this result is output.

Figure 3:
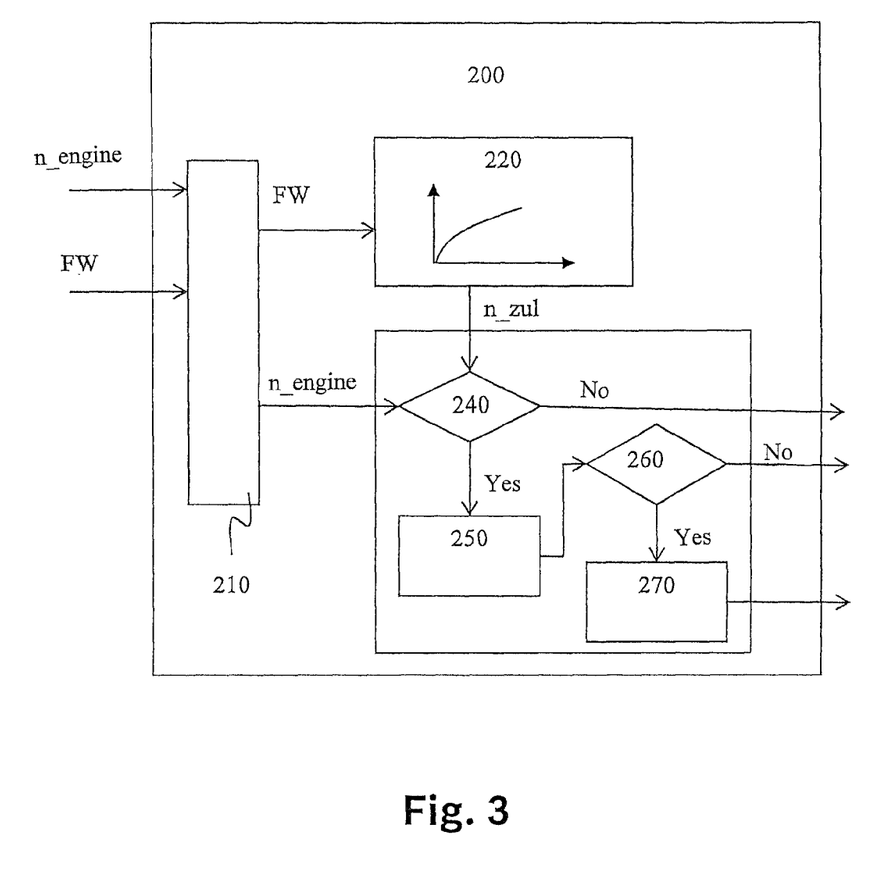
FIG. 3 schematically shows the configuration of the rotational speed monitoring.

FIG. 3 shows a possible specific embodiment of rotational speed monitoring unit 200 for the example that the engine is an internal combustion engine. Rotational speed monitoring unit 200 receives signals via an interface 210 about rotational speed n_engine of the crankshaft and driver input FW.

Figure 4:
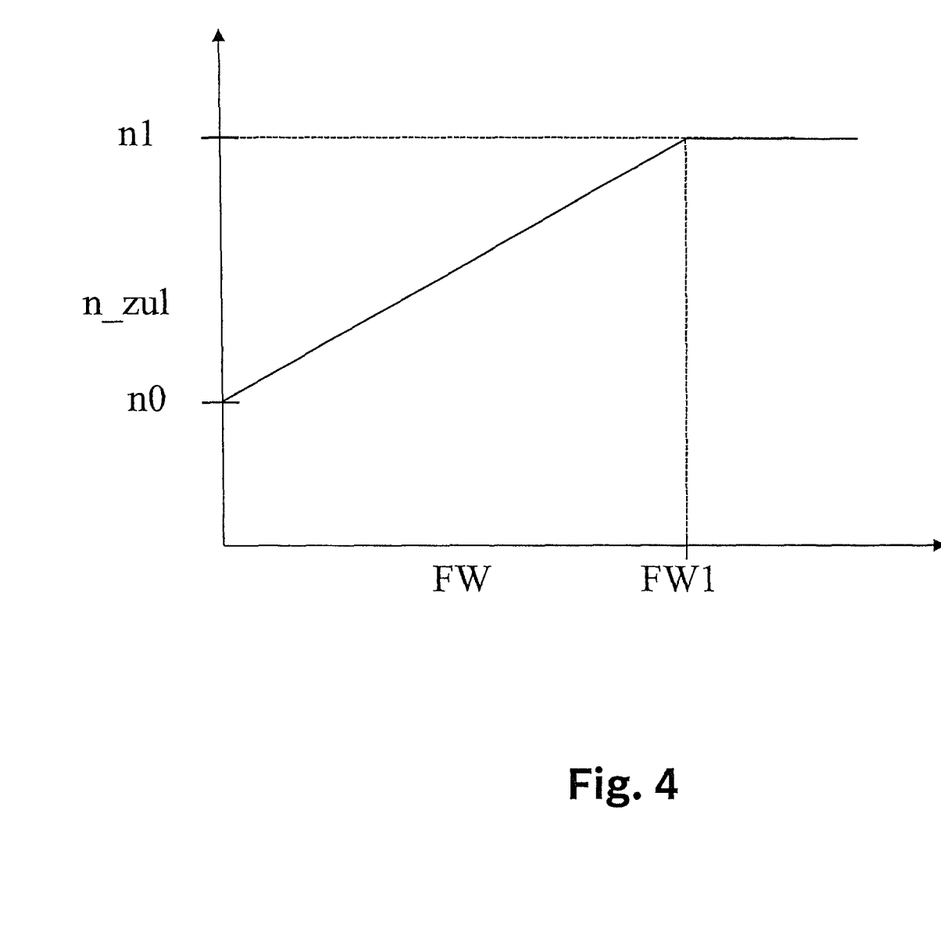
FIG. 4 schematically shows a possible relation between driver input and permissible engine speed.

Driver input FW is supplied to block 220, in which a permissible engine speed n_zul is ascertained with the aid of a characteristic curve, for example. It is possible that the permissible engine speed n_zul is devised to be independent from driver input FW. However, permissible engine speed n_zul may be selected to be dependent on driver input FW. It is possible, e.g., that the dependency is devised as shown in FIG. 4. If driver input FW is equal to 0, i.e., if the gas pedal is not actuated, permissible engine speed n_zul takes on an initial value n0, which may be greater than the idle speed of the engine, for example, 1200 revolutions/minute. As driver input FW increases, permissible engine speed n_zul increases until it reaches a limit rotational speed n1, such as 3000 revolutions/minute, at a limit driver input FW1. This increase in permissible engine speed n_zul as driver input FW increases may be linear, for example. If driver input FW takes on a value above limit driver input FW1, permissible engine speed n_zul remains identical to limit rotational speed n1.

Permissible engine speed n_zul thus ascertained and rotational speed n_engine are supplied to a comparison block 240. If rotational speed n_engine is not greater than permissible engine speed n_zul, comparison block 240, and thus also rotational speed monitoring unit 200, output that no error is present in the drive train (output "n"). In contrast, if it is detected that rotational speed n_engine is greater than permissible engine speed n_zul, an error is detected in the drive train (output "j").

Block 250 follows, in which the suppression of the injection in the engine is requested. Step 260 follows, in which it is checked whether the injections into the combustion chamber of the engine have in fact ceased. This may be done, for example, with the aid of a counter in the driver of an actuating stage of a fuel injector. If it is detected that in fact injections no longer take place, rotational speed monitoring unit 200 outputs that no error is present in the drive train (output "n"), optionally also with an additional piece of information that a deactivation of the injection has taken place.

If it is detected that fuel is injected despite the injection suppression requested in block 250 (output "j"), block 270 follows, in which a watchdog deactivation (WDA) takes place as a safe counter measure. A watchdog module, which monitors the correct function of control unit 1, is deactivated. The circuit actuation of the injection of the engine is deactivated here. Optionally, communication interfaces of control unit 1 (such as a connection to a CAN bus) may be deactivated. This causes the components of the drive train, which expect a communication message of control unit 1, to switch into a safe emergency operation when these messages fail to appear. Rotational speed monitoring unit 200 in this case reports that an error is present in the drive train, and optionally that a WDA reaction has taken place.

Switching control block 450 normally activates the switch in switching block 600 in such a way that the output signal of acceleration monitoring unit 100 is conducted to evaluation block 400.

Multiple predetermined conditions are stored in switching control block 450. These are consecutively checked, i.e., it is checked whether the instantaneous operating state of the motor vehicle, in particular of its drive, meets these conditions. If at least one of the conditions is met, the switch is switched in switching block 600, so that the output signal of rotational speed monitoring unit 200 is transmitted to evaluation block 400.

The list of predetermined conditions may include the following conditions:

Is it not possible to reliably transmit the sensor signals considered in the acceleration monitoring (in the example shown in FIG. 2, several or all of the sensor signals used to ascertain actual acceleration a_actual, driver input FW, actual velocity v_actual, rotational speed n_engine of the crankshaft, wheel speed n_wheel) from the assigned sensor to an electronic arithmetic unit on which the acceleration monitoring runs?

Is the accuracy or quality of the signals used impermissibly limited?

Is the drive of the motor vehicle in the pre-drive mode or in the post-drive mode?

Has a sensor signal of actual velocity v_actual, of actual acceleration a_actual, or one or multiple wheel speed signals n_wheel failed to appear?

Is the motor vehicle being decelerated, and does the difference between the actual acceleration and the permissible acceleration exceed a predefinable threshold value?

Is the value of actual acceleration a_actual greater by at most a second predefinable threshold value than the value of permissible acceleration a_zul, and is a setpoint torque M_setpoint or a driver input torque smaller than a torque threshold or is an acceleration derived from the torque smaller than an acceleration threshold?

Does the signal transmitted from ESP control unit 20 take on the value "NE", which indicates that the driving direction of the motor vehicle is unknown?

Is the motor vehicle being operated in the test bench operation?

Does the signal transmitted from airbag control unit 30 take on the value "Kj," which indicates that external action on the motor vehicle is present?

It goes without saying for those skilled in the art that all components and signals described here may be implemented in software, but may also all be implemented as hardware, but some may also be implemented as hardware and some as software.

What is claimed is:

1. A method for monitoring a drive of a motor vehicle, the method comprising:
   determining whether an operating state of a drive satisfies any of a set of at least one predetermined condition;
   determining whether there is an error in the drive of the motor vehicle by deviation of the drive of the motor vehicle from a requested drive of the motor vehicle corresponding to a position of a gas pedal; and
   responsive to a result of the error determination being that the error is present, executing a measure for counteracting the determined error;
   wherein:
   the determination of whether the error is present is performed by executing an algorithm, the algorithm providing that:
   whenever a result of the operating state determination is that none of the set of at least one predetermined condition is satisfied, the following first error detection is performed:
   comparing an ascertained actual acceleration of the motor vehicle, ascertained with the aid of a signal of at least one of a kinematics sensor, an acceleration sensor, and a wheel speed sensor to a setpoint acceleration of the motor vehicle that corresponds to the position of the gas pedal; and
   determining the presence of the error in response to the comparison of the accelerations being that there is a deviation between the actual and setpoint accelerations; and
   whenever, and responsive to that, the result of the operating state determination is that any of the set of at least one predetermined condition is satisfied, the following second error detection is performed instead of the first error handling:
   comparing an ascertained actual engine rotation speed or torque of an engine of the motor vehicle to a setpoint engine rotation speed or torque that corresponds to the position of the gas pedal; and
   determining the presence of the error in response to the comparison of the engine rotation speeds or torques being that there is a deviation between the actual and setpoint engine rotation speeds or torques; and
   the set includes at least one of the following:
   power up of the motor vehicle;
   power down of the motor vehicle;
   execution of a braking intervention;
   a failure to obtain a driving direction measurement;
   operation of the motor vehicle on a test bench; and
   a sensed collision of the motor vehicle with an object.

2. The method as recited in claim 1, wherein the second error detection includes the engine rotational speed comparison, and the counteracting, when the error is ascertained by the second error detection, includes preventing injections of the engine when the actual rotational speed is greater than the permissible engine speed.

3. The method of claim 1, wherein the at least one predetermined condition is selected so that the operating state meets the at least one predetermined condition when it is not possible to reliably transmit signals considered in the acceleration monitoring from the at least one of the kinematics sensor, the acceleration sensor, and the wheel speed sensor to a control unit on which the acceleration monitoring runs.

4. The method of claim 1, wherein the set of at least one predetermined condition includes the power up of the motor vehicle.

5. The method of claim 1, wherein the set of at least one predetermined condition includes the execution of the braking intervention in combination with a difference between the actual acceleration and the setpoint acceleration exceeding a predefinable threshold value.

6. The method of claim 1, wherein the set of at least one predetermined condition includes receipt of a signal from a driving direction detection device that a driving direction of the motor vehicle is unknown.

7. The method of claim 1, wherein the set of at least one predetermined condition includes the operation of the motor vehicle on the test bench.

8. The method of claim 1, wherein the set of at least one predetermined condition includes the sensed collision of the motor vehicle.

9. The method as recited in claim 1, wherein the set includes the failure to obtain the driving direction measurement.

10. The method as recited in claim 1, wherein the set includes the execution of the braking intervention.

11. The method as recited in claim 1, wherein the set includes the power down of the motor vehicle.

12. A non-transitory computer readable medium on which are stored instructions that are executable by a processor and that, when executed by the processor, causes the processor to perform a method for monitoring a drive of a motor vehicle, the method comprising:
   determining whether an operating state of a drive satisfies any of a set of at least one predetermined condition;
   determining whether there is an error in the drive of the motor vehicle by deviation of the drive of the motor vehicle from a requested drive of the motor vehicle corresponding to a position of a gas pedal; and
   responsive to a result of the error determination being that the error is present, executing a measure for counteracting the determined error;
   wherein:
      the determination of whether the error is present is performed by executing an algorithm, the algorithm providing that:
         whenever a result of the operating state determination is that none of the set of at least one predetermined condition is satisfied, the following first error detection is performed:
            comparing an ascertained actual acceleration of the motor vehicle, ascertained with the aid of a signal of at least one of a kinematics sensor, an acceleration sensor, and a wheel speed sensor to a setpoint acceleration of the motor vehicle that corresponds to the position of the gas pedal; and
            determining the presence of the error in response to the comparison of the accelerations being that there is a deviation between the actual and setpoint accelerations; and
         whenever, and responsive to that, the result of the operating state determination is that any of the set of at least one predetermined condition is satisfied, the following second error detection is performed instead of the first error handling:
            comparing an ascertained actual engine rotation speed or torque of an engine of the motor vehicle to a setpoint engine rotation speed or torque that corresponds to the position of the gas pedal; and
            determining the presence of the error in response to the comparison of the engine rotation speeds or torques being that there is a deviation between the actual and setpoint engine rotation speeds or torques; and
   the set includes at least one of the following:
      power up of the motor vehicle;
      power down of the motor vehicle;
      execution of a braking intervention;
      a failure to obtain a driving direction measurement;
      operation of the motor vehicle on a test bench; and
      a sensed collision of the motor vehicle with an object.

13. A control unit, comprising:
   a computer processor; and
   a non-transitory computer readable medium on which are stored instructions that are executable by the processor and that, when executed by the processor, causes that processor to perform a method for monitoring a drive of a motor vehicle, the method comprising:
      determining whether an operating state of a drive satisfies any of a set of at least one predetermined condition;
      determining whether there is an error in the drive of the motor vehicle by deviation of the drive of the motor vehicle from a requested drive of the motor vehicle corresponding to a position of a gas pedal; and
      responsive to a result of the error determination being that the error is present, executing a measure for counteracting the determined error;
   wherein:
      the determination of whether the error is present is performed by executing an algorithm, the algorithm providing that:
         whenever a result of the operating state determination is that none of the set of at least one predetermined condition is satisfied, the following first error detection is performed:
            comparing an ascertained actual acceleration of the motor vehicle, ascertained with the aid of a signal of at least one of a kinematics sensor, an acceleration sensor, and a wheel speed sensor to a setpoint acceleration of the motor vehicle that corresponds to the position of the gas pedal; and
            determining the presence of the error in response to the comparison of the accelerations being that there is a deviation between the actual and setpoint accelerations; and
         whenever, and responsive to that, the result of the operating state determination is that any of the set of at least one predetermined condition is satisfied, the following second error detection is performed instead of the first error handling:
            comparing an ascertained actual engine rotation speed or torque of an engine of the motor vehicle to a setpoint engine rotation speed or torque that corresponds to the position of the gas pedal; and
            determining the presence of the error in response to the comparison of the engine rotation speeds or torques being that there is a deviation between the actual and setpoint engine rotation speeds or torques; and
   the set includes at least one of the following:
      power up of the motor vehicle;
      power down of the motor vehicle;
      execution of a braking intervention;

a failure to obtain a driving direction measurement;
operation of the motor vehicle on a test bench; and
a sensed collision of the motor vehicle with an object.

14. A control unit for monitoring a drive of a motor vehicle, the control unit comprising:
first processing circuitry;
second processing circuitry;
third processing circuitry; and
a switch;
wherein:
    each of the first and second processing circuitry is configured to determine whether there is an error in the drive of the motor vehicle by deviation of the drive of the motor vehicle from a requested drive of the motor vehicle corresponding to a position of a gas pedal;
    the first processing circuitry is configured to perform the error determination by:
        comparing an ascertained actual acceleration of the motor vehicle, ascertained with the aid of a signal of at least one of a kinematics sensor, an acceleration sensor, and a wheel speed sensor to a setpoint acceleration of the motor vehicle that corresponds to the position of the gas pedal; and
        determining the presence of the error in response to the comparison of the accelerations being that there is a deviation between the actual and setpoint accelerations;
    the second processing circuitry is configured to perform the error determination by:
        comparing an ascertained actual engine rotation speed or torque of an engine of the motor vehicle to a setpoint engine rotation speed or torque that corresponds to the position of the gas pedal; and
        determining the presence of the error in response to the comparison of the engine rotation speeds or torques being that there is a deviation between the actual and setpoint engine rotation speeds or torques;
    the switch is configured to shift between (a) a first position in which an output of the first processing circuitry and not the second processing circuitry is provided to the third processing circuitry and (b) a second position in which an output of the second processing circuitry and not the first processing circuitry is provided to the third processing circuitry;
    the third processing unit is configured to:
        determine whether an operating state of a drive satisfies any of a set of at least one predetermined condition;
        whenever a result of the operating state determination is that none of the set of at least one predetermined condition is satisfied, operate the switch to be at the first position;
        whenever, and responsive to that, the result of the operating state determination is that any of the set of at least one predetermined condition is satisfied, operate the switch to be at the second position; and
        responsive to a result of the error determination passed via the switch to the third circuitry being that the error is present, executing a measure for counteracting the determined error; and
    the set includes at least one of the following:
        power up of the motor vehicle;
        power down of the motor vehicle;
        execution of a braking intervention;
        a failure to obtain a driving direction measurement;
        operation of the motor vehicle on a test bench; and
        a sensed collision of the motor vehicle with an object.

\* \* \* \* \*